US012655659B2

(12) United States Patent
Lien

(10) Patent No.: US 12,655,659 B2
(45) Date of Patent: Jun. 16, 2026

(54) ELECTRONIC PADLOCK

(71) Applicant: WAFERLOCK Corp., Taichung City (TW)

(72) Inventor: Chih-Min Lien, Taichung City (TW)

(73) Assignee: WAFERLOCK Corp., Taichung City (TW)

( * ) Notice: Subject to any disclaimer, the term of this patent is extended or adjusted under 35 U.S.C. 154(b) by 37 days.

(21) Appl. No.: 18/604,269

(22) Filed: Mar. 13, 2024

(65) Prior Publication Data

US 2025/0172017 A1 May 29, 2025

(30) Foreign Application Priority Data

Nov. 24, 2023 (TW) ................................ 112145608

(51) Int. Cl.
*E05B 67/38* (2006.01)
*E05B 67/06* (2006.01)
*E05B 35/00* (2006.01)

(52) U.S. Cl.
CPC .............. *E05B 67/38* (2013.01); *E05B 67/06* (2013.01); *E05B 2035/009* (2013.01)

(58) Field of Classification Search
CPC .. E05B 47/00; E05B 2047/0028; E05B 67/18; E05B 67/38; E05B 67/06; E05B 2035/009; Y10T 70/424; Y10T 70/489
USPC .............................................................. 70/20
See application file for complete search history.

(56) References Cited

U.S. PATENT DOCUMENTS 5,896,761 A * 4/1999 Chen ........................ E05B 67/24 70/38 A
2004/0194516 A1* 10/2004 Chen ........................ E05B 67/24 70/366
2012/0011902 A1* 1/2012 Meekma ................. E05B 47/06 70/52

(Continued)

FOREIGN PATENT DOCUMENTS

CN 210127739 U * 6/2020
CN 114320037 4/2022

(Continued)

OTHER PUBLICATIONS

Search Report appended to an Office Action, which was issued to Taiwanese counterpart application No. 112145608 by the TIPO on Oct. 11, 2024, with an English translation thereof.

*Primary Examiner* — Suzanne L Barrett
(74) *Attorney, Agent, or Firm* — Burris Law, PLLC

(57) ABSTRACT

The electronic padlock includes an outer casing unit, a security module, a shackle unit, and a clutch unit. The outer casing unit includes a case body including an accommodation space, a rear base wall, and a rear cover plate. The rear base wall has a rear opening communicated with the accommodation space. The rear cover plate has a securing groove. The security module is mounted to the rear base wall, and has a swing member, and a rotatable button. The swing member is disposed in the accommodation space, and has a rotation restricting portion, and a hook portion engageable with the rear cover plate. The rotatable button extends into the accommodation space to connect the swing member, and is operable to rotate the swing member so that the hook portion of the swing member engages or disengages from the securing groove of the rear cover plate.

13 Claims, 14 Drawing Sheets

(56) References Cited

U.S. PATENT DOCUMENTS

| | | | | |
|---|---|---|---|---|
| 2014/0150502 | A1* | 6/2014 | Duncan | E05B 47/0004 70/20 |
| 2020/0273271 | A1* | 8/2020 | Fan | E05B 47/0001 |
| 2021/0324662 | A1* | 10/2021 | Ng | E05B 67/06 |

FOREIGN PATENT DOCUMENTS

| | | | | |
|---|---|---|---|---|
| CN | 218715943 | U | | 3/2023 |
| CN | 219826495 | U | * | 10/2023 |

* cited by examiner

ELECTRONIC PADLOCK

CROSS-REFERENCE TO RELATED APPLICATION

This application claims priority to Taiwanese Invention Patent Application No. 112145608, filed on Nov. 24, 2023, and incorporated by reference herein in its entirety.

FIELD

The disclosure relates to a padlock, and more particularly to an electronic padlock.

BACKGROUND

Referring to FIG. 1, a conventional electronic padlock 1 as disclosed in Chinese Invention Patent No. CN114320037A includes an outer casing 11, a shackle 12, two elastically biased engaging arms 13, and a push rod 14. The shackle 12 is U-shaped and is movably inserted in the outer casing 11. The two elastically biased engaging arms 13 are spaced apart from each other, and each has an end that is hemispherical and another end that is rounded. The push rod 14 has two opposite ends that are configured to each abut against the rounded end of one of the elastically biased engaging arms 13. The shackle 12 has a long shackle leg 121 and a short shackle leg 122, and is configured to be movable between a locked position and an unlocked position relative to the outer casing 11. When the shackle 12 is in the locked position, the two opposite ends of the push rod 14 are each abutting against the rounded end of one of the elastically biased engaging arms 13, thereby causing the hemispherical ends of the elastically biased engaging arms 13 to respectively engage and lock the long shackle leg 121 and the short shackle leg 122 of the shackle 12. When the shackle 12 is in the unlocked position, the push rod 14 is in a downward position and does not contact the elastically biased engaging arms 13, thereby causing the hemispherical ends of the elastically biased engaging arms 13 to disengage from the long shackle leg 121 and the short shackle leg 122 of the shackle 12 and allow the shackle 12 to be moved upwardly and unlock the conventional electronic padlock 1.

Referring to FIG. 2, an operator with criminal intent to unlock the conventional electronic padlock 1 may insert a thin aluminum sheet 10 in a gap between the short shackle leg 122 of the shackle 12 and the outer casing 11, and then rotate the thin aluminum sheet 10 with a pair of pliers (not shown) to thereby disengaging the hemispherical end of one of the elastically biased engaging arms 13 with the short shackle leg 12, and cause the rounded end of the elastically biased engaging arm 13 to push against an end of the push rod 14 so as to move the push rod 14 into the downward position and unlock the conventional electronic padlock 1. Therefore, the conventional electronic padlock 1 may be easily unlocked by an operator with criminal intent, making the conventional electronic padlock 1 unsecure, and a user of the conventional electronic padlock 1 will have safety issues.

SUMMARY

Therefore, an object of the disclosure is to provide an electronic padlock that can alleviate at least one of the drawbacks of the prior art.

According to the disclosure, the electronic padlock includes an outer casing unit, a security module, two insertion holes, a shackle unit, and a clutch unit. The outer casing unit includes a case body that includes an accommodation space, a rear base wall, and a rear cover plate. The rear base wall has a rear opening communicated with the accommodation space. The rear cover plate is removably mounted to the rear base wall to cover the rear opening, and has a securing groove. The security module is rotatably mounted to the rear base wall, and has a swing member, and a rotatable button. The swing member is disposed swingably in the accommodation space, and has a rotation restricting portion, and a hook portion that is removably engageable with the securing groove of the rear cover plate. The in rotatable button is disposed outside of the accommodation space, extends into the accommodation space to connect the swing member, and is operable to rotate the swing member. The two insertion holes extend through an outer surface of the case body and an inner surface of the case body in a top-bottom direction. The shackle unit includes a long shackle leg and a short shackle leg that are respectively movably inserted through the accommodation space in the top-bottom direction. Each of the long shackle leg and the short shackle leg has a notch. The clutch unit is mounted to the outer casing unit, and includes two slide blocks that are movable in a left-right direction, and a blocking member that is movable in the top-bottom direction. Each of the slide blocks have an engaging portion for removably engaging a notch of one of the long and short shackle legs. The blocking member is movable in the top-bottom direction between a locked position and an unlocked position. In the locked position, the blocking member is interposed between the two slide blocks to lock the slide blocks against movements that causes the engaging portions of the slide blocks to disengage from the notches of the long shackle leg and the short shackle leg, so that a bottom end of the long shackle leg stably presses the rotation restricting portion of the swing member, and so that the hook portion of the swing member stably engages the securing groove of the cover plate. In the unlocked position, the blocking member is distal to the slide blocks to allow movement of the slide blocks that causes the slide blocks to disengage from the notches of the long and short shackle legs, so that the bottom end of the long shackle leg unpresses the rotation restricting portion of the swing member. The rotatable button is operable to rotate and disengage the hook portion of the swing member from the securing groove of the rear cover plate.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
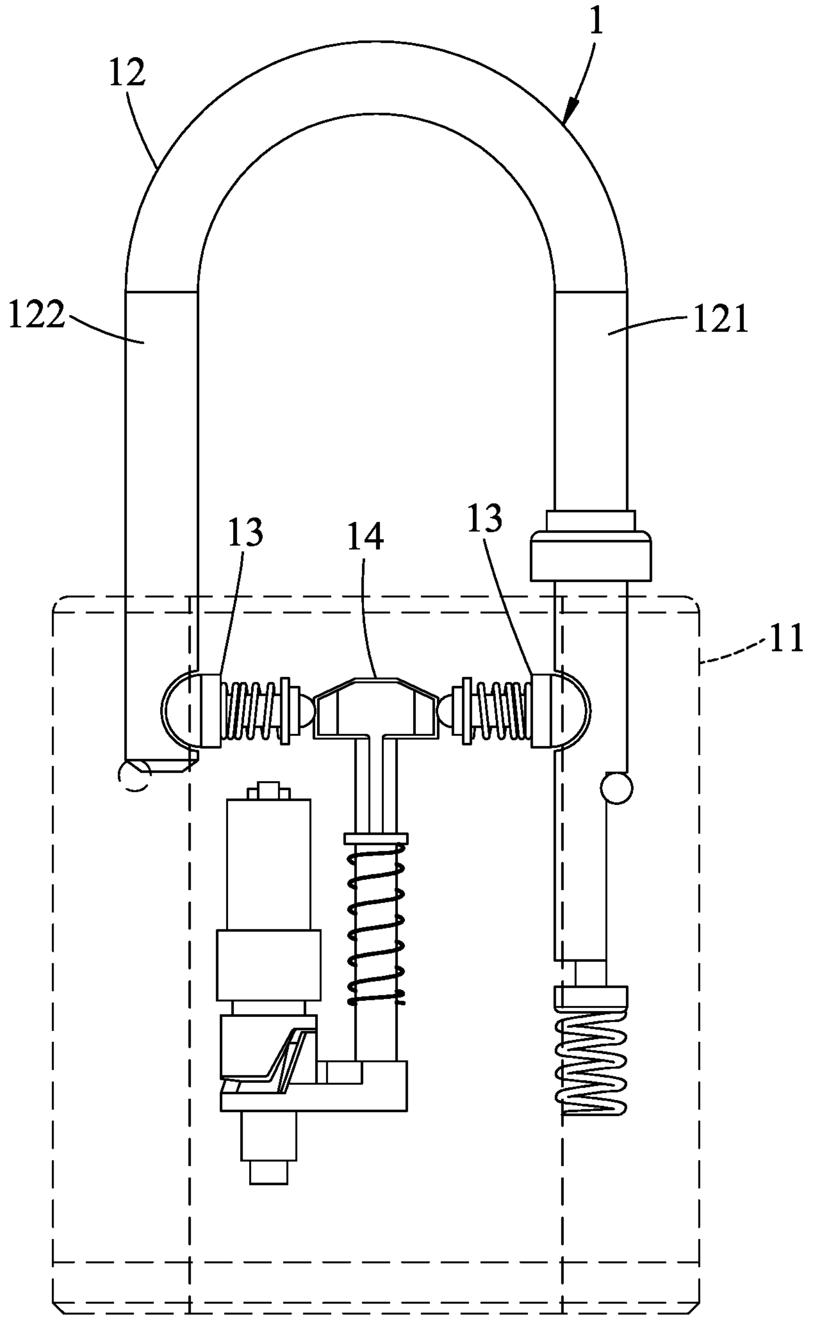
FIG. 1 PRIOR ART
FIG. 1 is a schematic partially ghosted side view illustrating a conventional electronic padlock as disclosure in Chinese Invention Patent No. CN114320037A
Figure 2:
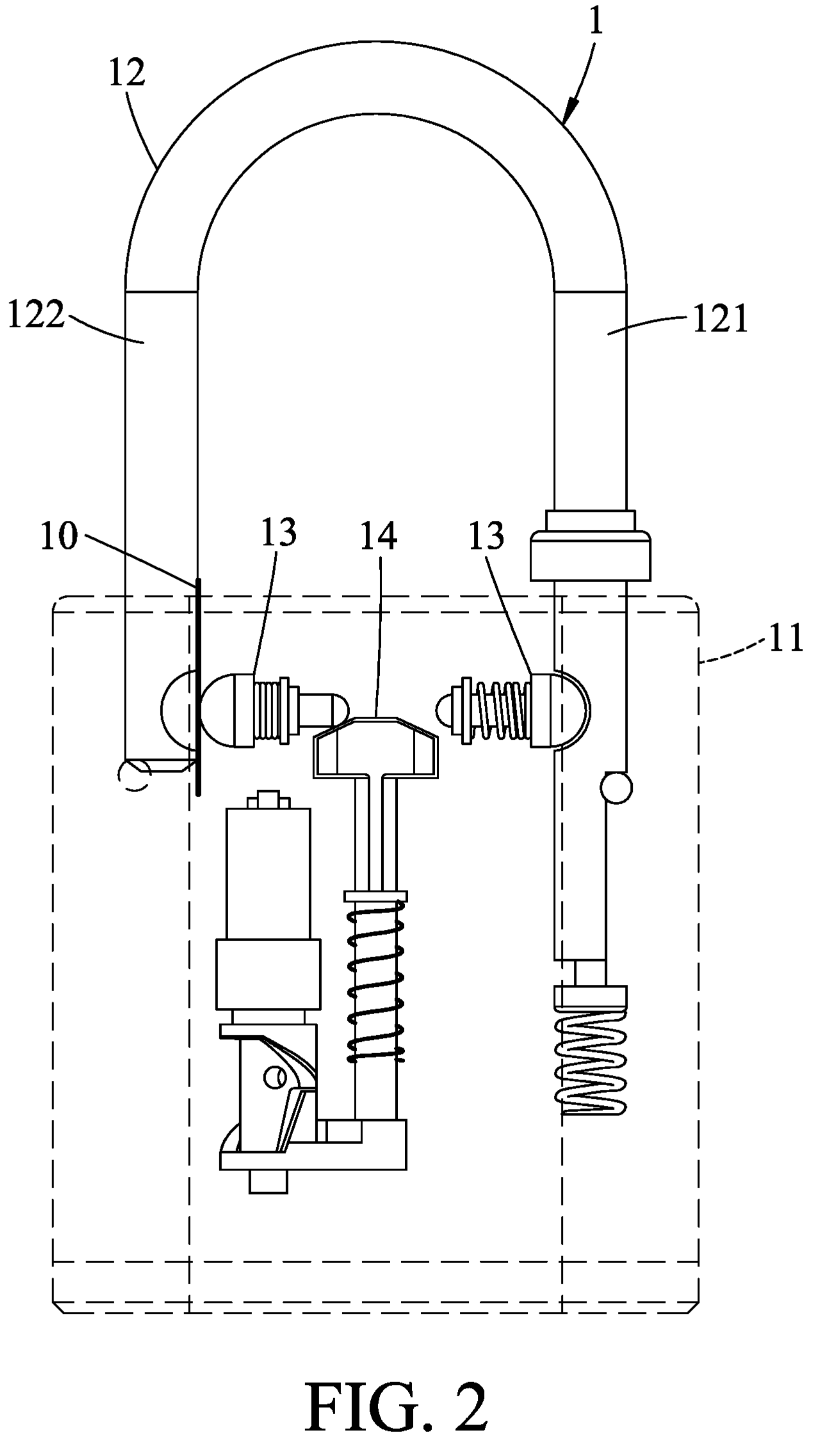
FIG. 2 PRIOR ART
FIG. 2 is a schematic partially ghosted side view illustrating an unauthorized unlocking method being used on the conventional electronic padlock.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as “top,” “bottom,” “upper,” “lower,” “on,” “above,” “over,” “downwardly,” “upwardly” and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 3:
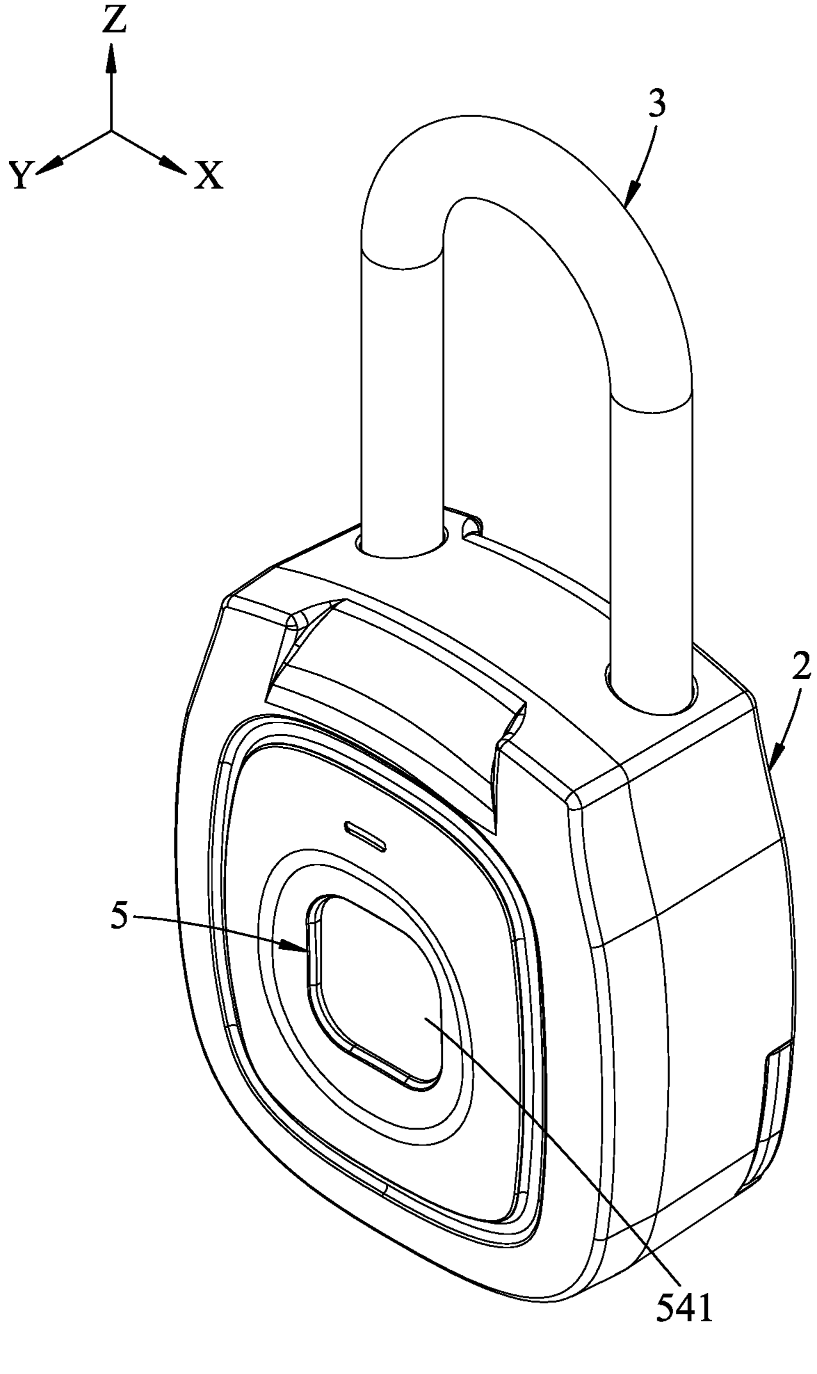
FIG. 3 is a perspective view illustrating an embodiment of an electronic padlock according to the present disclosure.
Figure 4:
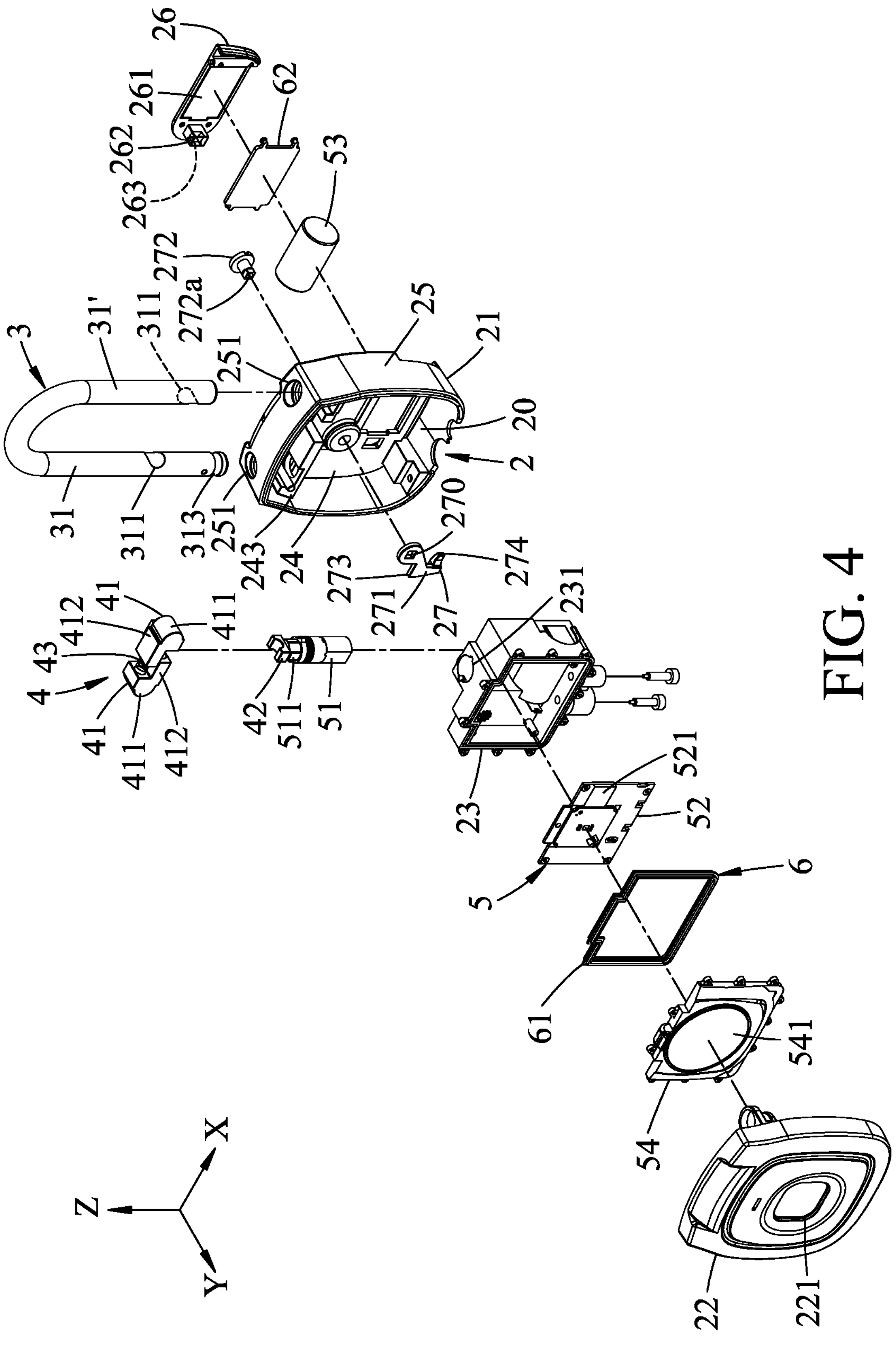
FIG. 4 is an exploded perspective view of the embodiment.
Figure 5:
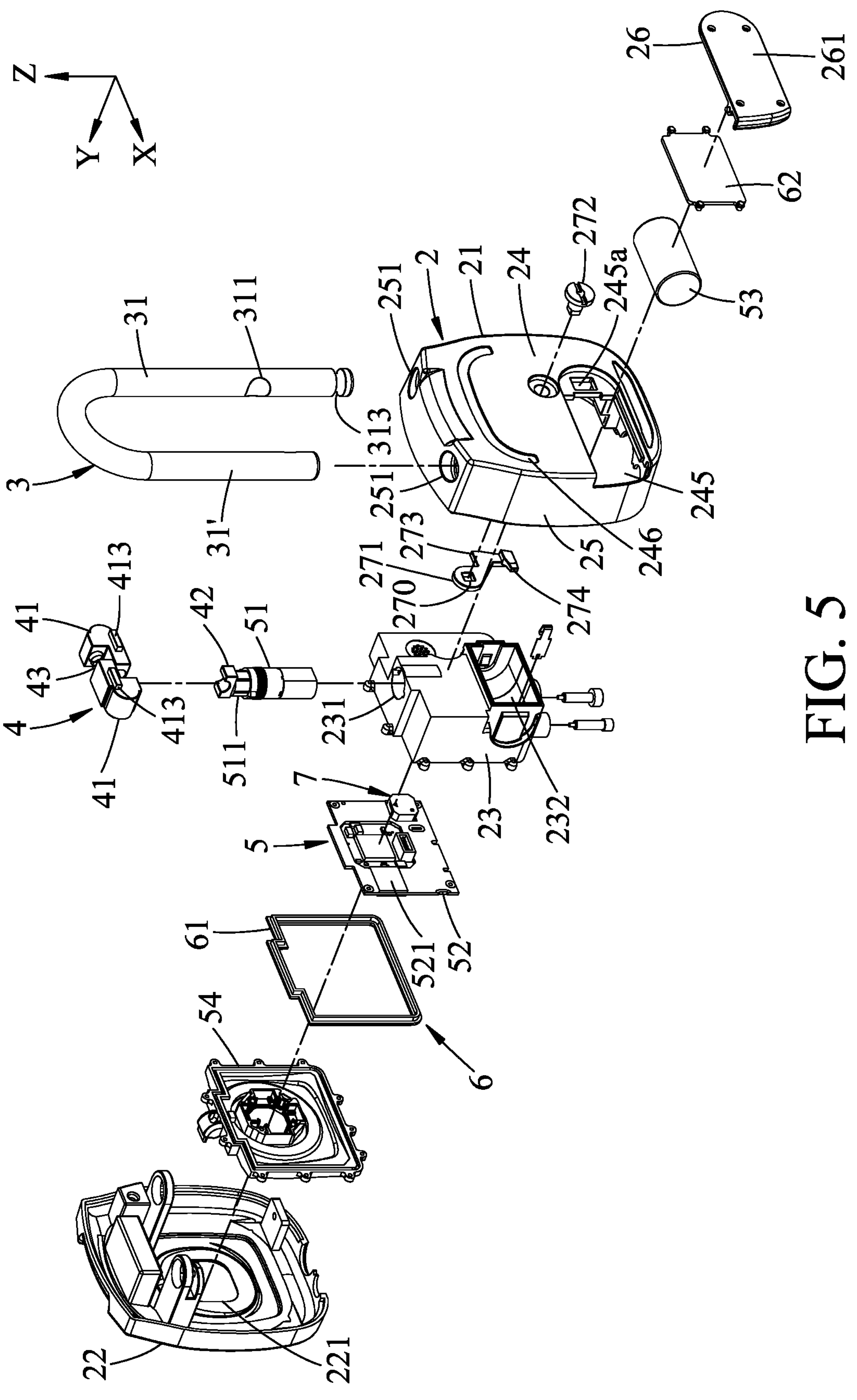
FIG. 5 is another exploded perspective view of the embodiment viewed from a viewing angle that is different from FIG. 4.

Referring to FIGS. 3 to 5 a first embodiment of an electronic padlock according to the present disclosure includes an outer casing unit 2, a shackle unit 3, a clutch unit 4, a control unit 5, a water resistance unit 6, a loudspeaker unit 7, and a security module 27. The electronic padlock may be locked in a locked state or be unlocked to be in an unlocked state.

The outer casing unit 2 includes a case body 21, a front case cover 22, and a base seat 23. The case body 21 includes an accommodation space 20, the front case cover 22 cooperatively defines the accommodation space 20 with the case body 21. The base seat 23 is located inside the accommodation space 20 and is assembled with the front case cover 22 and the case body.

Figure 6:
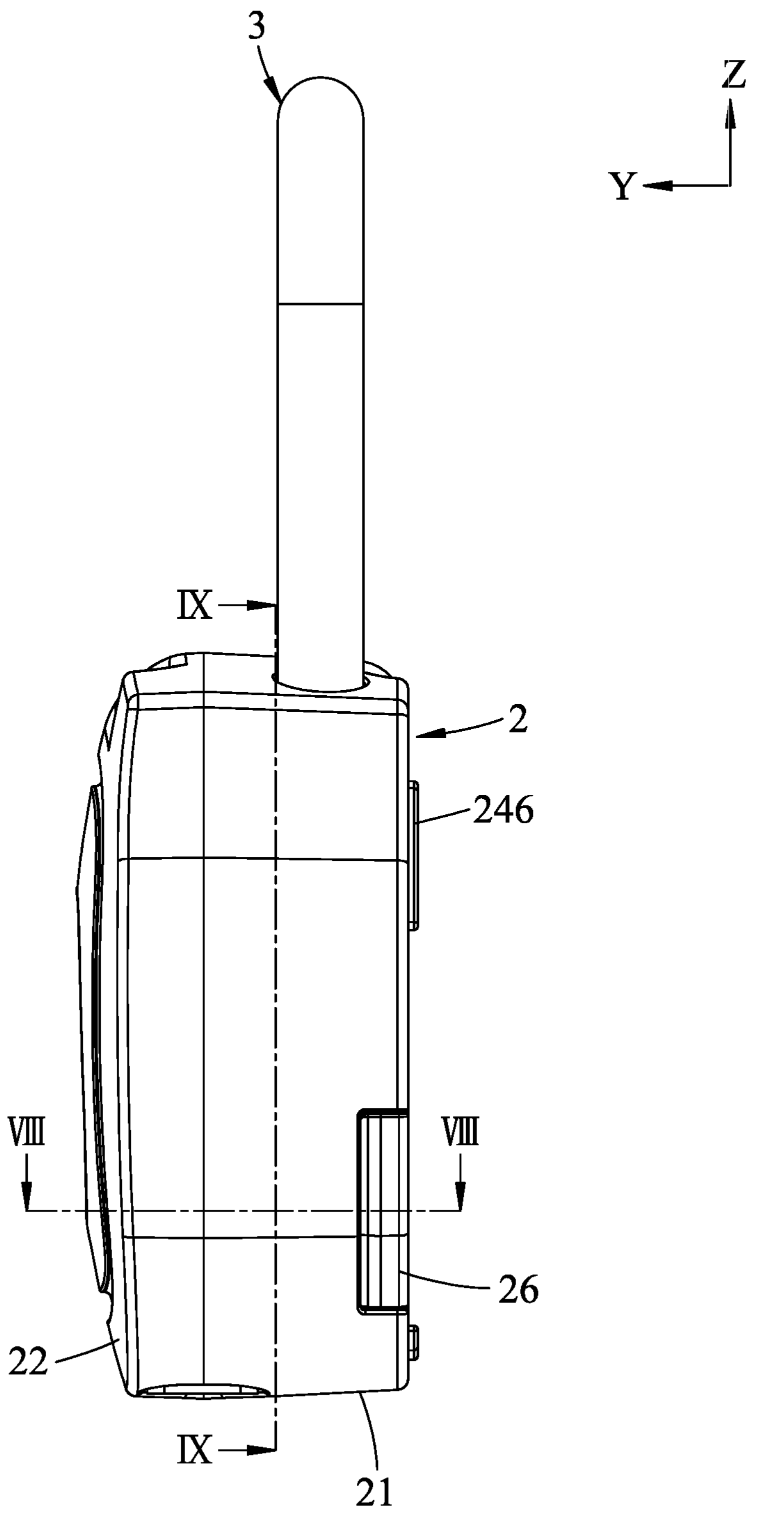
FIG. 6 is a side view illustrating the embodiment.

Referring to FIGS. 4 to 6, the case body 21 includes a rear base wall 24, a surrounding wall 25, and a rear cover plate 26. The rear base wall 24 has a rear opening 245 communicated with the accommodation space 20. The surrounding wall 25 extends forwardly from an outer periphery of the rear base wall 24 to the front case cover 22 and loops around the accommodation space 20. The rear cover plate 26 is removably mounted on the rear base wall 24 to cover the rear opening 245. The security module 27 is rotatably mounted to the rear base wall 24.

Figure 7:
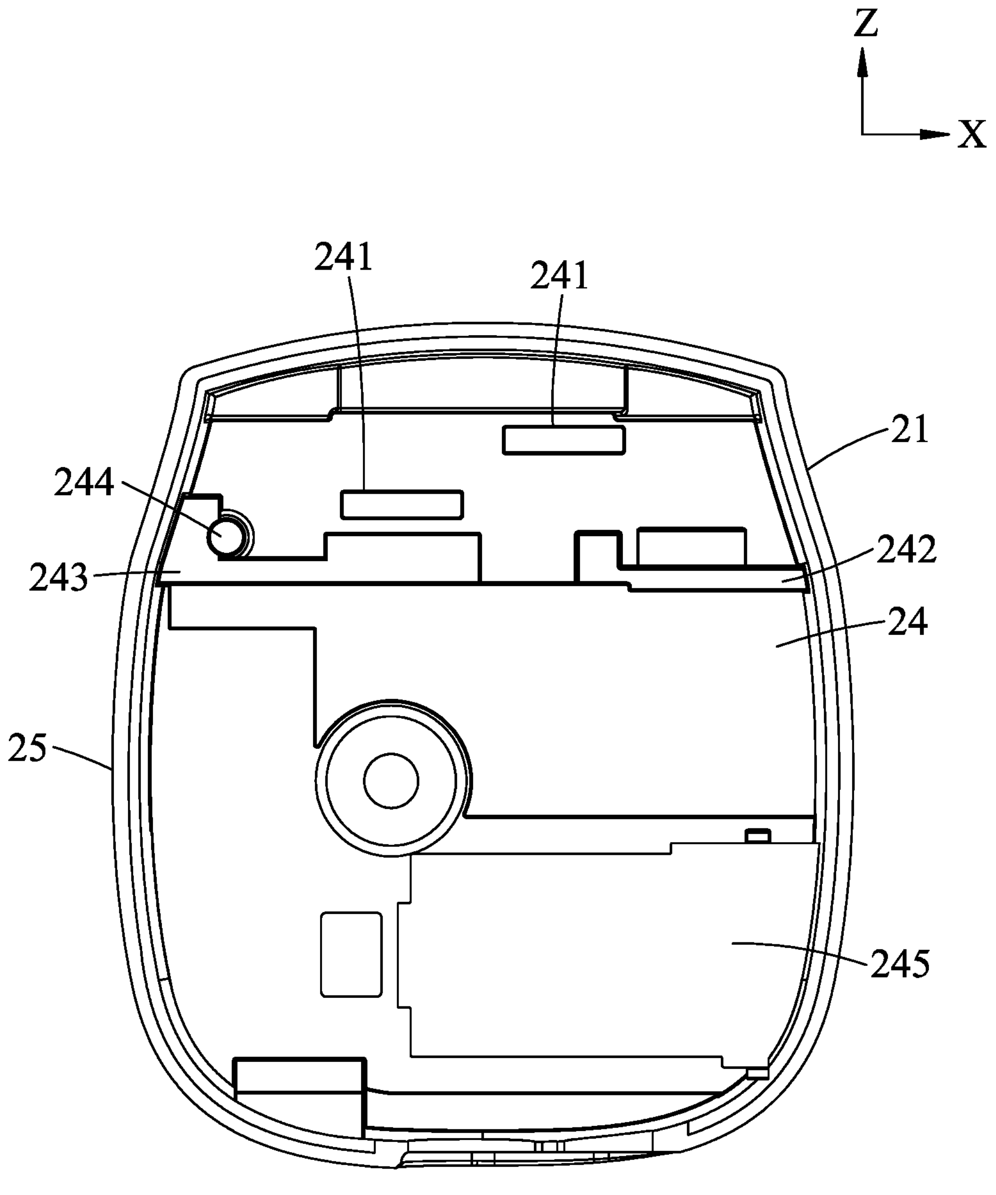
FIG. 7 is a frontal view showing a case body of the electronic padlock.

Referring to FIGS. 5 to 7, the rear base wall 24 has two slide slots 241, and a blocking piece 242, a limiting piece 243, a protruding rod 244, the rear opening 245, and an anti-slip pad 246. The two slide slots 241 extend in a left-right direction (X), and are spaced apart in the left-right direction (X). One of the slide slots 241 is higher than the other one of the slide slots 241 in a top-bottom direction (Z). The blocking piece 242 that extends from the surrounding wall 25 in a front-rear direction (Y), and is spaced apart from the slide slots 241 in the top-bottom direction (Z). The limiting piece 243 is spaced apart from the blocking piece 242 in the left-right direction (X); the blocking piece 242 and the limiting piece 243 are disposed on opposite sides of the rear base wall 24. The protruding rod 244 is located adjacent to the limiting piece 243 and extends in the front-rear direction (Y). The rear opening 245 communicates the accommodation space 20 with the external environment. The anti-slip pad 246 is exposed from the rear base wall 24 and is arranged in a roughly U-shape.

Referring to FIGS. 4 and 5, the surrounding wall 25 has two insertion holes 251 that extend through an outer surface and an inner surface of a top side of the surrounding wall 25 and that are spatially communicated with the accommodation space 20. In this embodiment, the two insertion holes 251 are circular holes, are spaced apart from each other, and extend in the top-bottom direction (Z) through the surrounding wall 25.

Figure 8:
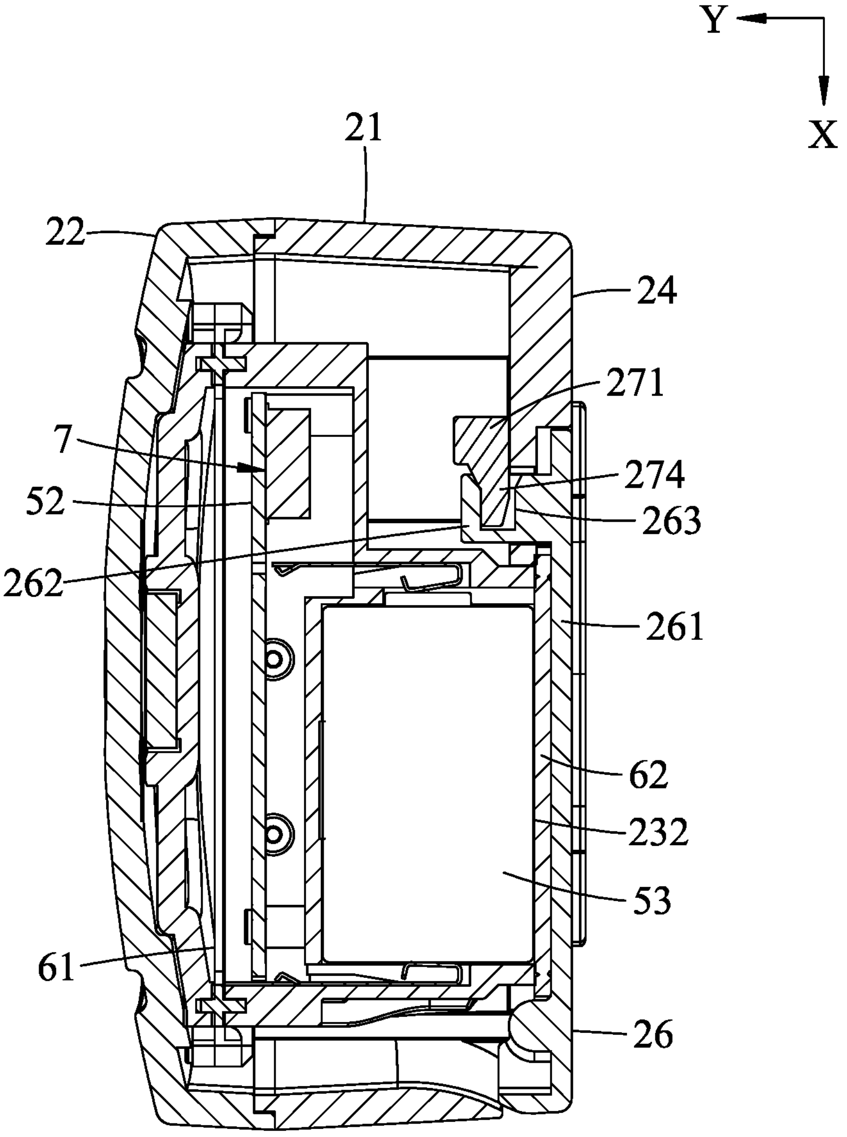
FIG. 8 is a cross-sectional view taken from a line VIII-VIII in FIG. 6 illustrating a swing member of a security module.

Referring to FIGS. 4, 5 and 8, the rear cover plate 26 has an inner surface 261, a securing post 262, and a securing groove 263. The securing post 262 protrudes from the inner surface 261 of the rear cover plate 26 in the front-rear direction (Y), and extends into the accommodation space 20. The securing groove 263 is open in the left-right direction (X).

The rear base wall 24 further has a rear slot **245*a* that is spaced apart from the rear opening 245. The rear cover plate 26 covers both of the rear slot 245*a* and the rear opening 245. The securing post 262 passes through the rear slot 245*a* to extend into the accommodation space 20. The securing post 262 has the securing groove 263. When the blocking member 42 moves to the locked positon, a hook portion 274 (see FIGS. 4 and 9, for example, and see a detail thereof hereinafter) of the security module 27 will move in a direction transverse to the front-rear direction (Y) to extend into the securing groove 263**.

The security module 27 has a swing member 271, and a rotatable button 272. The swing member 271 is disposed swingably in the accommodation space 20, and has a rotation restricting portion 273, and the hook portion 274 removably engageable with the securing groove 263 of the cover plate 26. The rotatable button 272 is disposed outside of the accommodation space 20, and is operable to rotate the swing member 271. The rotatable button 272 has a front end that extends into the accommodation space 20 to connect the swing member 271, and a rear end that is located on a rear side of the rear base wall 24. More specifically, the rotatable button 272 is mounted to the rear base wall 24 near the securing groove 263 of the rear cover plate 26, and has a pivot pin **272*a* extending into the accommodation space 20 through the rear base wall 24 in the front-rear direction (Y). The swing member 271 further has a pivot portion 270 (see FIG. 9) journaled on the pivot pin 272*a*. The rotation restricting portion 273 and the hook portion 274 are connected to the pivot portion 270. The hook portion 274 is moved into the securing groove 263 when the pivot portion 270 is rotated in a first direction, and is moved out of the securing groove 263 when the pivot portion 270 is rotated in a second direction opposite to the first direction. The securing post 263 is prevented from moving away from the rear slot 254*a* of the rear base wall 24 when the hook portion 274 extends into the securing groove 263. The rotation restricting portion 273 is pressed by the long shackle leg 31 of the shackle unit 3 when the pivot portion 270 is rotated in the first direction, and unpressed by the long shackle leg 31 when the pivot portion 273** is rotated in the second direction.

Referring to FIGS. 5, 6 and 8, the front case cover 22 interlocks with the case body 21 along the front-rear direction (Y), and has a roughly square shaped window opening 221.

The base seat 23 has a top side with a substantially circular through hole 231, and a rear side formed with a battery mounting space 232 that is opened toward the rear cover plate 26.

Figure 9:
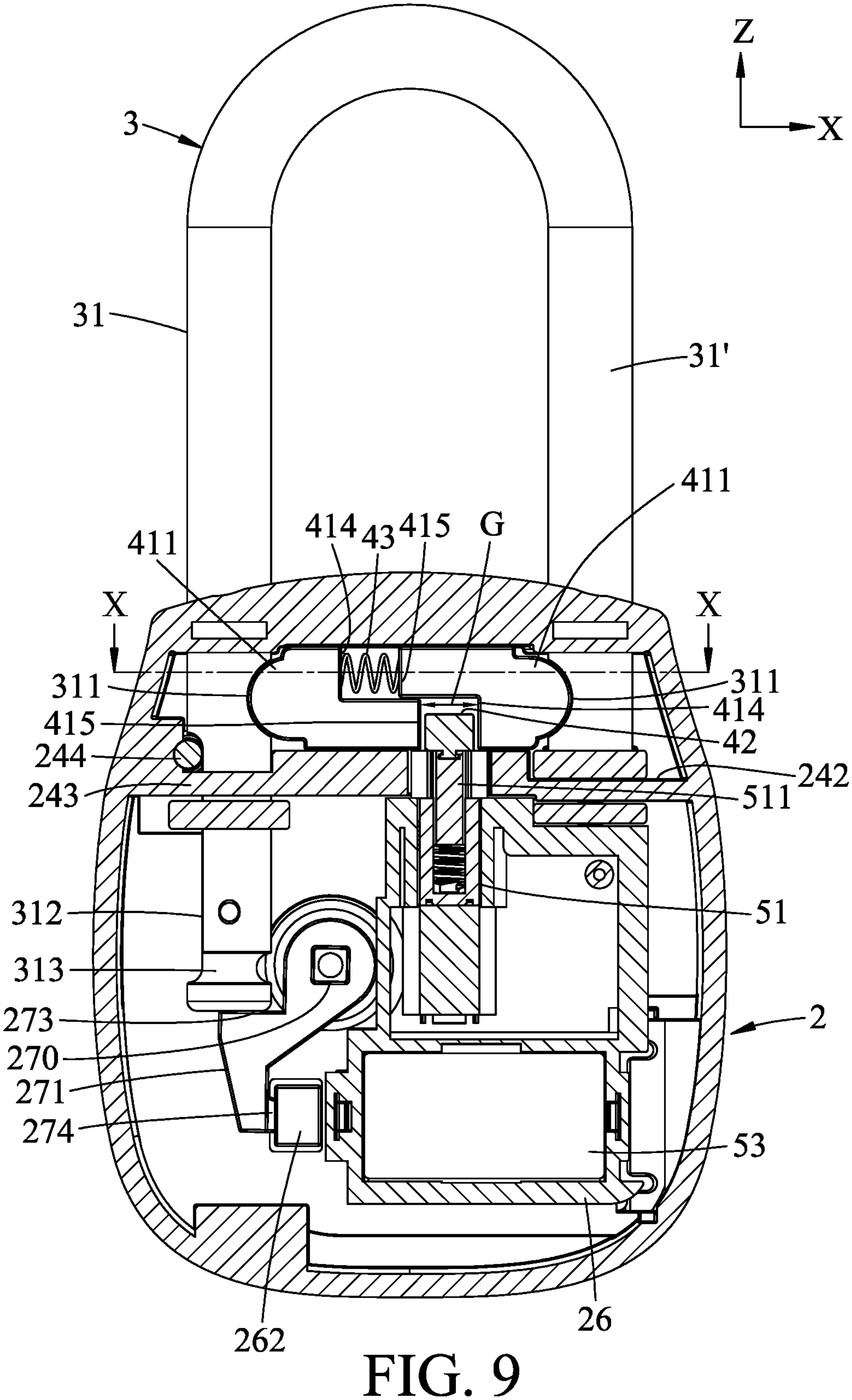
FIG. 9 is a cross-sectional view taken from a line IX-IX in FIG. 6 illustrating positions of a long shackle and a short shackle of a shackle unit in a locked state.

Referring to FIGS. 4, 5 and 9, the shackle unit 3 includes a long shackle leg 31 and a short shackle leg 31'. The long shackle leg 31 and the short shackle leg 31' are respectively insertable into the insertion holes 251. Each of the long shackle leg 31 and the short shackle leg 31' has a notch 311 that face each other. The long shackle leg 31 has a length that is greater than a length of the short shackle leg 31' in the top-bottom direction. The long shackle leg 31 further includes a narrowed thin portion 312 that is indented from an outermost surface of the long shackle leg 31 and that extends in the top-bottom direction (Z), and an annular necked section 313 that is formed near a bottom end of the long shackle leg 31.

The clutch unit 4 is mounted to the outer casing unit 2, and includes two slide blocks 41, a blocking member 42, and an elastic member 43. The two slide blocks 41 are movable in the left-right direction (X). The blocking member 42 is movable in the top-bottom direction (Z) and is inserted into the through hole 231 of the base seat 23. The elastic member 43 is disposed between the two slide blocks 41 and spaced above the blocking member 42 in the top-bottom direction (Z), and biasing the two slide blocks 41 to move in the left-right direction (X) away from each other. In this embodiment, the elastic member 43 is a compression spring.

Figure 10:
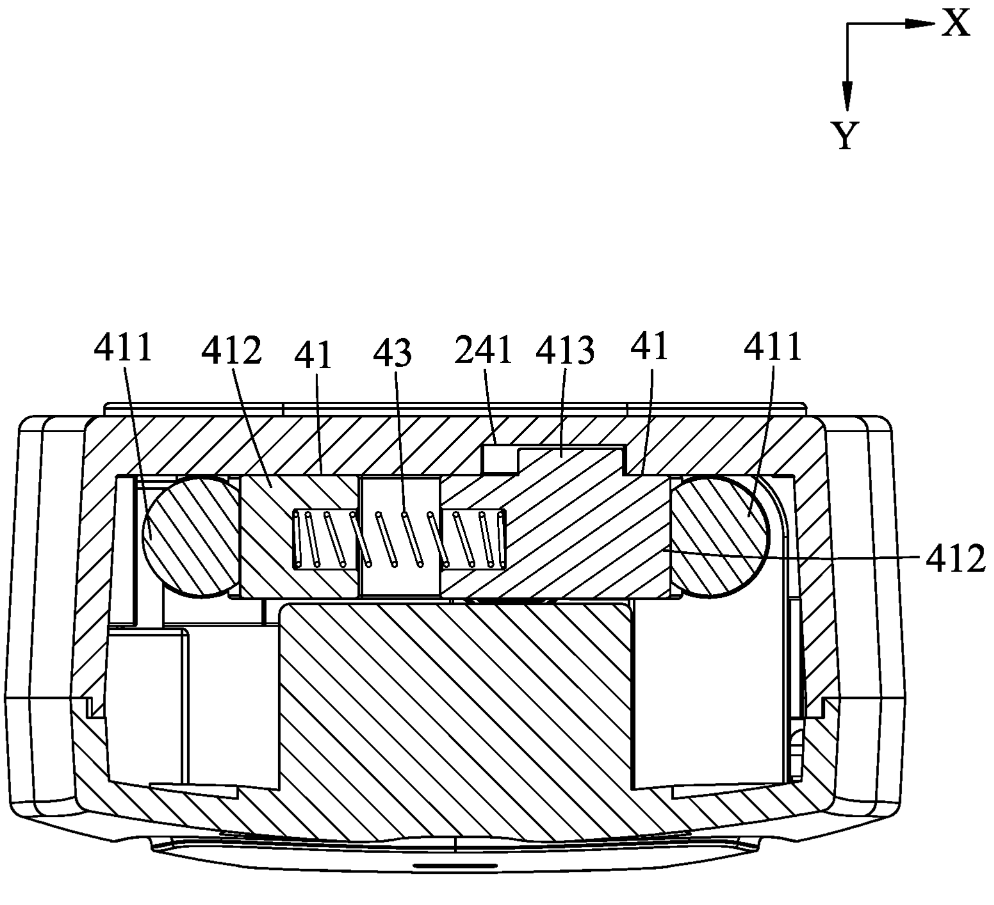
FIG. 10 is a cross-sectional view taken from a line X-X in FIG. 9 illustrating the embodiment.

Referring to FIGS. 5, 9 and 10, each of the slide blocks 41 has an engaging portion 411, an overlapping portion 412, and a guide post 413. The engaging portion 411 of each of the slide blocks 41 is for removably engaging a notch 311 of one of the long and short shackle legs 31, 31'. The guide post 413 of each of the slide blocks 41 slidably engages one of the two slide slots 241. In this embodiment, the guide post 413 has a rectangular shape.

The engaging portion 411 of each of the slide blocks 41 has a first surface 414 opposite to the notch 311 of one of the long and short shackle legs 31, 31'. The overlapping portion 412 of each of the slide blocks 41 protrudes from the first surface 414 in the left-right direction (X), and has a second surface 415 that is distal to the first surface 414.

The overlapping portions 412 of the slide blocks 41 overlaps with each other between the engaging portions 411 of the slide blocks 41 and is stacked in the top-bottom direction (Z).

Figure 11:
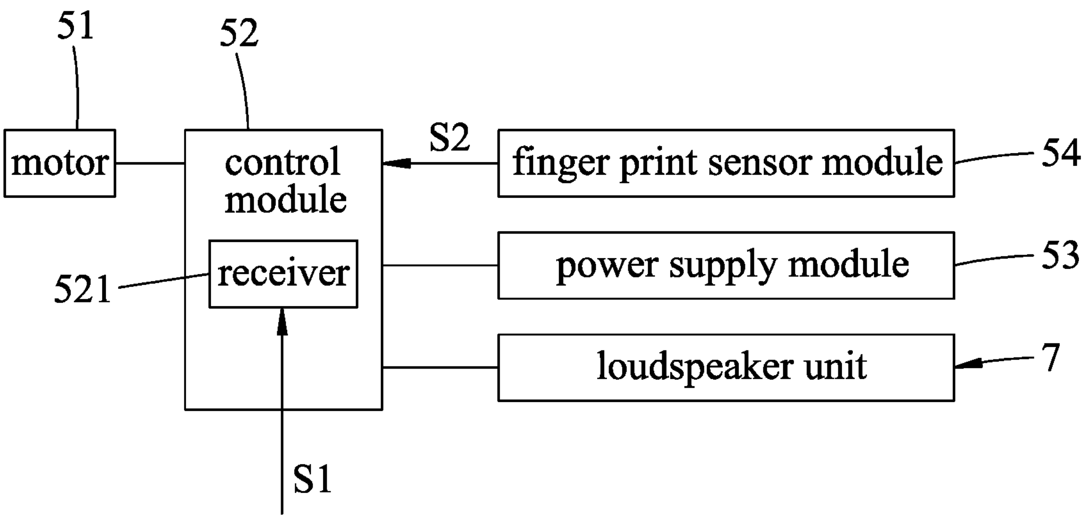
FIG. 11 is a block diagram showing a control unit of the electronic padlock.

Referring to FIGS. 4, 5 and 11, the control unit 5 is disposed in the accommodation space 20 of the outer casing unit 2. The control unit 5 includes a motor 51, a control module 52, a power supply module 53, a finger print sensor module 54, and a plunger 511. The control module 52 is signally connected to the motor 51. The power supply module 53 is electrically connected to the control module 52 for supplying electrical power to the control module 52. The finger print sensor module 54 is signally connected to the control module 52.

The plunger 511 is connected to the motor 51 to drive movement of the blocking member 42 in the top-bottom direction (Z).

In some embodiments, the control module 52 may be a printed circuit board (PCB) and has a receiver 521 that is configured to receive an unlock signal (S1). The receiver 521 may be a Bluetooth® receiver. In some variations of the embodiment, a user may wirelessly connect to the receiver 521 via a mobile device (not shown), and send the unlock signal (S1) via the mobile device. The receiver 521 will receive the unlock signal (S1) sent from the mobile device and send the unlock signal (S1) to the control module 52. The control module 52 after receiving the unlock signal (S1) will activate the motor 51 which controls the plunger 511 to drive the blocking member 42, thereby unlocking the electronic padlock.

The finger print sensor module 54 has a touch panel 541 that is exposed on an exterior of the outer casing unit 2, and that is adapted for detecting fingerprint (not shown) input from the user. The finger print sensor module 54 is able to generate an unlock signal (S2) according to a fingerprint input of the user, when the fingerprint input of the user is determined to satisfy a preset criteria. The control module 52 is able to receive the unlock signal (S2) generated by the finger print sensor module 54 and control the plunger 511 to drive the blocking member 42 to move from the locked position to the unlocked position which unlocks the electronic padlock.

The water resistance unit 6 includes a water resistant seal 61 and a water resistant cover 62. The water resistant seal 61 is disposed between the finger print sensor module 54 and the control module 52. The water resistant cover 62 is disposed between the power supply module 53 and the rear cover plate 26, and seals off the battery mounting space 232. The water resistant seal 61 may prevent moisture from entering the control module 52 via the finger print sensor module 54 and thereby affecting the operation of the control module 52. The water resistant cover 62 prevents moisture from entering the battery mounting space 232 from the rear cover plate 26 and thereby affecting the efficiency and longevity of the power supply module 53.

The loudspeaker unit 7 is signally connected to the control module 52 and is adapted to vibrate or broadcast sound. In this embodiment, the loudspeaker unit 7 is a buzzer. When the power supply module 53 does not have enough power, the loudspeaker unit 7 is configured to buzz or vibrate to remind the user to charge or replace the power supply module 53.

Figure 12:
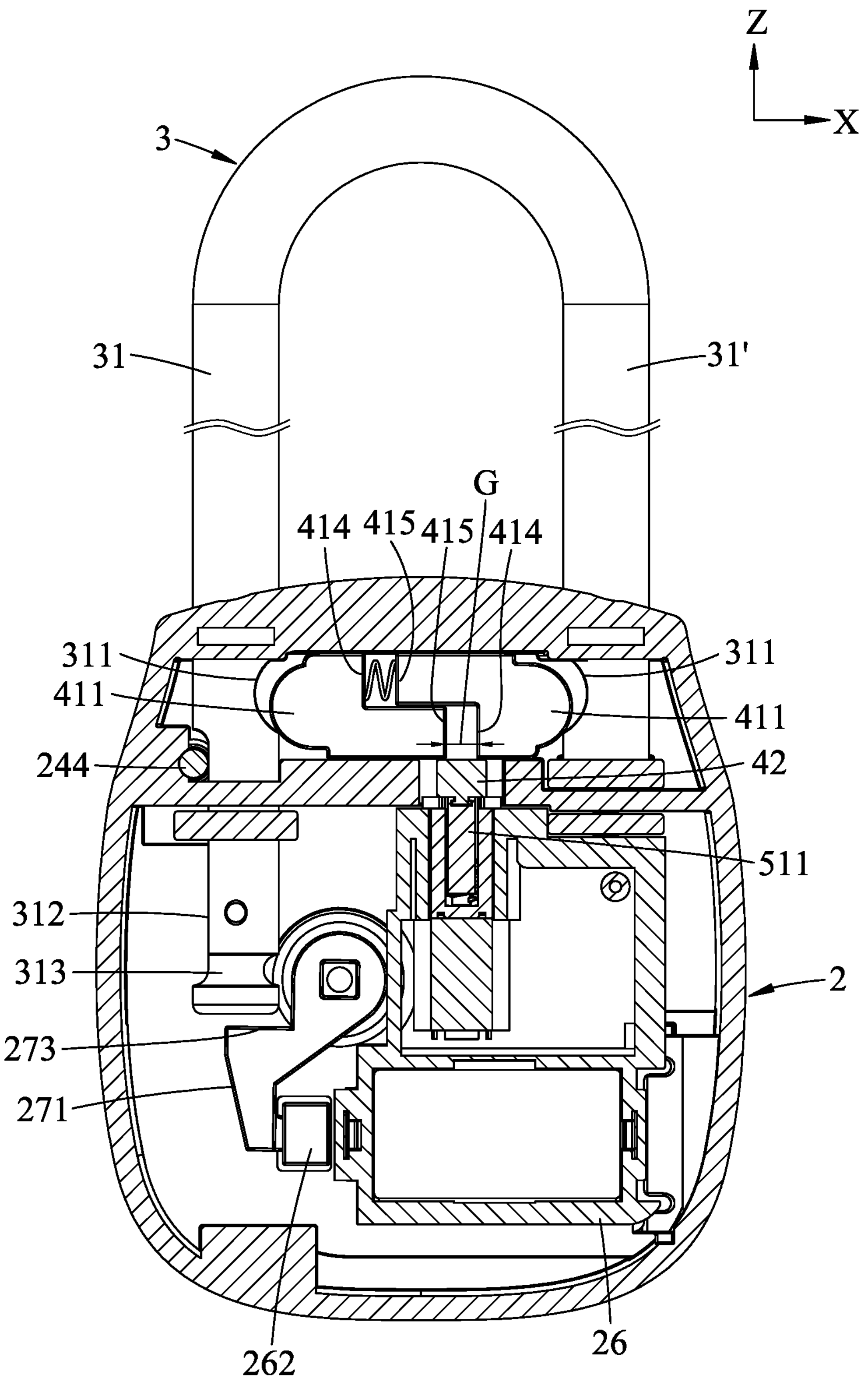
FIG. 12 is a cross-sectional view illustrating the positions of the long shackle and the short shackle of the shackle unit in an initial unlocked state.
Figure 13:
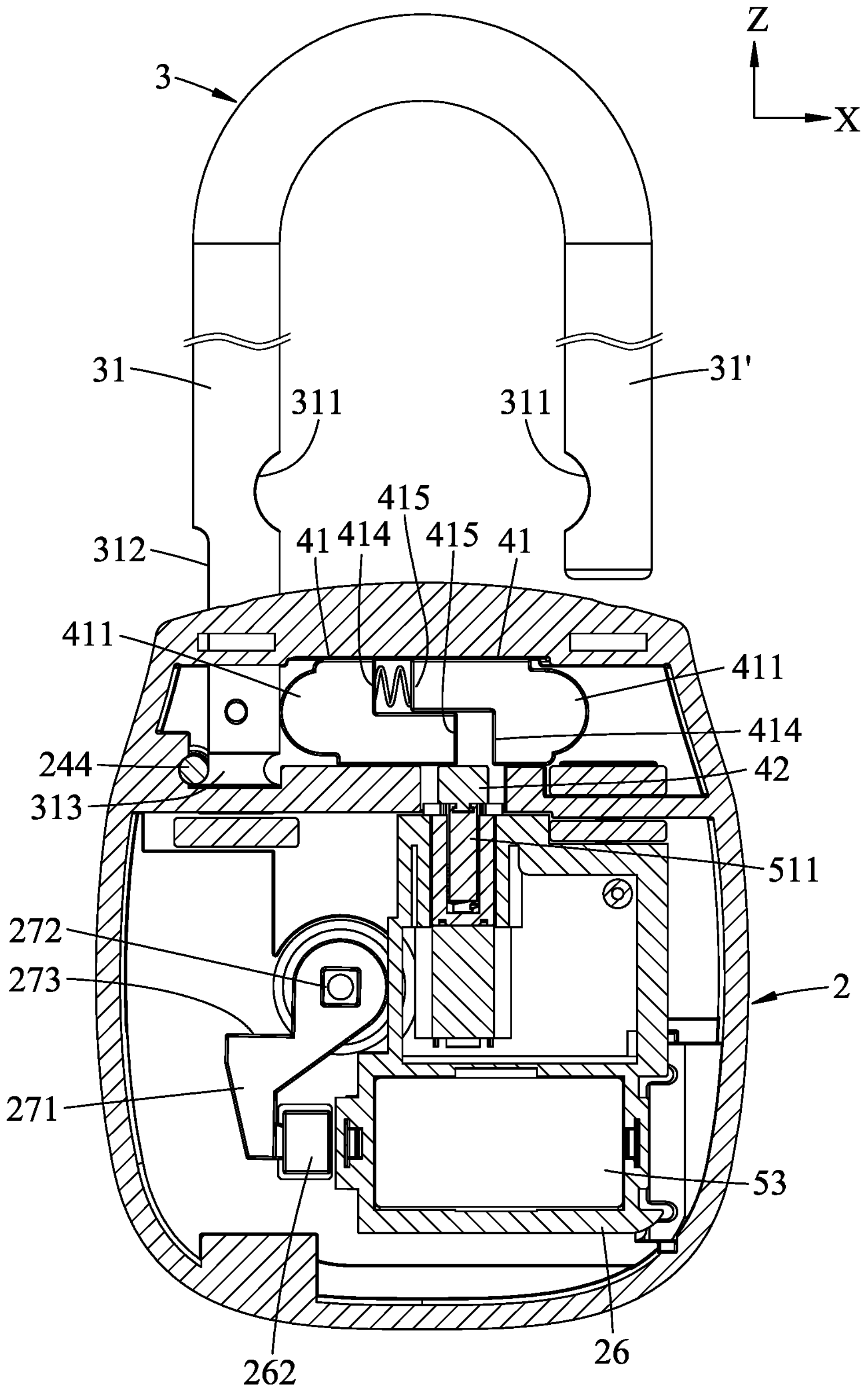
FIG. 13 is another cross-sectional view illustrating the positions of the long shackle and the short shackle in a final unlocked state.
Figure 14:
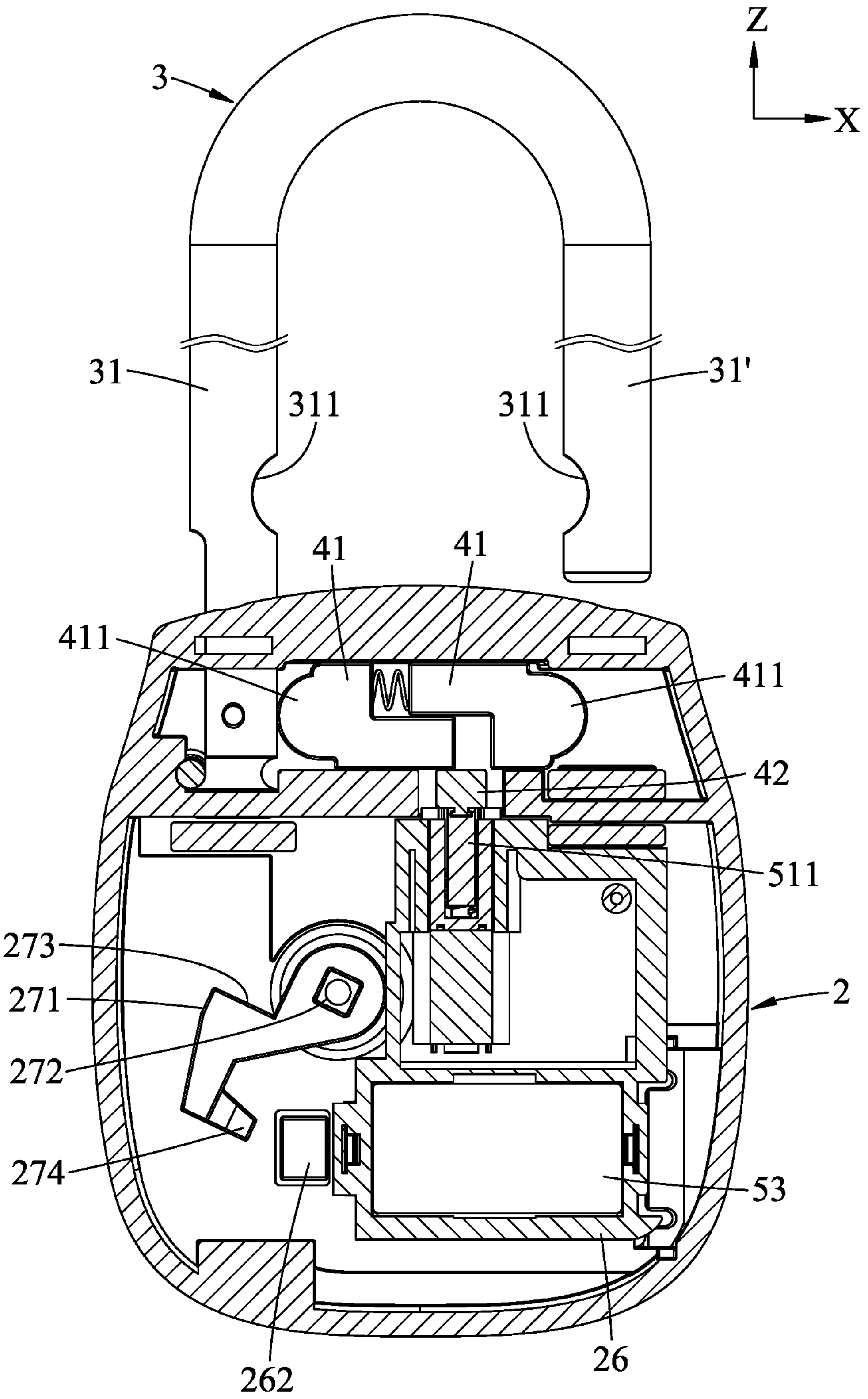
FIG. 14 is a cross-sectional view illustrating the swing member of the security module that is rotated away when the long shackle and the short shackle are in the final unlocked state.

Referring to FIGS. 9, 12 and 13, the blocking member 42 is movable by the plunger 511 between a locked position (as shown in FIG. 9) and an unlocked position (as shown in FIGS. 12, and 13) which respectively brings the electronic padlock to a locked state and an unlocked state.

Referring to FIGS. 9 and 10, when the blocking member 42 is in the locked position, the blocking member 42 is interposed between the two slide blocks 41 to lock the slide blocks 41 against movements that cause the engaging portions 411 of the slide blocks 41 to disengage from the notches 311 of the long shackle leg 31 and the short shackle leg 31', so that the bottom end of the long shackle leg 31 stably presses the rotation restricting portion 273 of the swing member 271, and so that the hook portion 274 of the swing member 271 stably engages the securing groove 263 of the cover plate 26. Furthermore, a bottom end of the short shackle leg 31' abuts against the blocking piece 242 of the rear base wall 24, the protruding rod 244 of the rear base wall 24 abuts against the narrowed thin portion 312 of the long shackle leg 31. When the blocking member 42 is moved to the locked position, the guide posts 413 of the slide blocks 41 respectively slide along the slide slots 241 to move away from each other. The second surfaces 415 of the overlapping portions 412 of the slide blocks 41 respectively face the first surfaces 414 of the engaging portions 411 of slide blocks 41 in a spaced apart manner to form a gap (G) therebetween. When the blocking member 42 is in the locked position, the blocking member 42 resides in the gap (G), and the gap (G) has a maximum width in the left-right direction (Y). When the blocking member 42 is in the unlocked position, the blocking member 42 moves away from the gap (G), and the gap (G) has a minimum width in the left-right direction (Y).

The gap (G) has a lower gap portion to receive the blocking member 42, and an upper gap portion above the lower gap portion. The elastic member 43 of the clutch unit is disposed in the upper gap portion for biasing the slide blocks 41.

Referring to FIGS. 5, 12 and 13, when the blocking member 42 is moved from the locked position to the unlocked position, the blocking member 42 is moved downwardly in the top-bottom direction away from the two slide blocks 41. When the blocking member 42 is in the unlocked position, the blocking member 42 is distal to the slide blocks 41 to allow movement of the slide blocks 41 that causes the slide blocks 41 to disengage from the notches 311 of the long and short shackle legs 31, 31', so that the bottom end of the long shackle leg 31 unpresses the rotation restricting portion 273 of the swing member 271. The rotatable button 272 is operable to rotate and disengage the hook portion 274 of the swing member 271 from the securing groove 263 of the rear cover plate 26. Furthermore, when the blocking member 42 moves to the unlocked position, the guide posts 413 of the slide blocks 41 respectively slide in the slide slots 241 to move toward each other. Additionally, after the slide blocks 41 are disengage from the notches 311 of the long and short shackle legs 31, 31', the shackle unit 3 may be moved upwardly in the top-bottom direction (Z) causing the narrowed thin portion 312 of the long shackle leg 31 to slide upward over the protruding rod 244 until the annular necked section 313 of the long shackle leg 31 engages the protruding rod 44. In this state, the notches 311 of the long and short shackle legs 31, 31' are exposed. Moreover, when the blocking member 42 is in the unlocked position, the blocking member 42 moves away from the gap (G), and the gap (G) has a minimum width in the left-right direction (X).

It should be noted that, the rotation restricting portion 273 of the swing member 271 faces the bottom end of the long shackle leg 31. Therefore, when the blocking member 42 is in the locked position (see FIG. 9), and the engaging portion 411 of each of the slide blocks 41 is engaging a notch 311 of one of the long and short shackle legs 31, 31', the bottom end of the long shackle leg 31 stably presses the rotation restricting portion 273 of the swing member 271 and the hook portion 274 of the swing member 271 stably engages the securing groove 263 of the cover plate 26, thereby preventing the cover plate 26 from being removed from the rear base wall 24. On the other hand, when the blocking member 42 is in the unlocked position, the bottom end of said long shackle leg 31 unpresses said rotation restricting portion 273 of said swing member 271, allowing the rotatable button 272 to be operated to rotate and disengage the hook portion 274 of the swing member 271 from the securing groove 263 of the rear cover plate 26. Thus, only when the blocking member 42 is in the unlocked position, may the rear cover plate 26 be removed for the user to access the battery mounting space 232 and replace the power supply module 53.

Therefore, only when the control module 54 detects a fingerprint input that satisfied the preset criterion, and the blocking member 42 is in the unlocked position, may the user remove the rear cover plate 26 and replace the power supply module 53 (battery). This prevents an operator that is not the owner of the electronic padlock from removing the rear cover plate 26 and replacing the power supply module 53. The electronic padlock therefore offers the user more security.

Referring to FIGS. 3, 11, and 13, when the electronic padlock is used, the user imprints his finger on the finger print sensor module 54, when the fingerprint input of the user satisfies a preset criterion, the finger print sensor module 54 generates an unlock signal (S2) according to the fingerprint input of the user. The control module 52 is able to receive the unlock signal (S2) and control the plunger 511 to drive the blocking member 42 to move from the locked position to the unlocked position.

It should be noted that, the loudspeaker unit 7 may provide sound or vibration feedback whenever the electronic padlock is in the locked state, the unlocked state, or when sensing a fingerprint input of a user that does not fit the preset criterion. However, this is not a limitation of the present disclosure.

In summary of the above, when the blocking member 42 is in the locked position, the blocking member 42 is interposed between the two slide blocks 41 to lock the slide blocks 41 against movements that causes the engaging portions 411 of the slide blocks 41 to disengage from the notches 311 of the long shackle leg 31 and the short shackle leg 31'. Therefore, the blocking member 42 and the slide blocks 41 cannot be moved to disengage from the notches 311, when in the locked position, without the fingerprint input of the user which satisfies the preset criterion, thereby preventing accidental or intentional unlocking of the electronic padlock.

When the blocking member 42 is in the locked position, the bottom end of the long shackle leg 31 stably presses the rotation restricting portion 273 of the swing member 271 and prevents rotation of swing member 271 of the security module 27; however, only when the bottom end of the long shackle leg 31 unpresses said rotation restricting portion 273 of said swing member 271 may the swing member 271 of the security module 26 be rotated. This prevents the rear cover plate 26 from being opened when the blocking member 42 is in the locked position which effectively provides more security for the user.

The water resistant seal 61 may prevent moisture from entering the control module 52 via the finger print sensor module 54 and thereby affecting the operation of the control module 52.

In the electronic padlock of the disclosure, when the battery level of the power supply module 53 is too low, the loudspeaker unit 7 may vibrate or make a sound to alert the user to replace or charge the power supply module 53. The electronic padlock is therefore convenient and easy to use.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An electronic padlock comprising:

an outer casing unit including a case body that includes an accommodation space, a rear base wall having a rear opening communicated with said accommodation space, and a rear cover plate removably mounted to said rear base wall to cover said rear opening, and having a securing groove;

a security module rotatably mounted to said rear base wall, and having a swing member that is disposed swingably in said accommodation space, and that has a rotation restricting portion, and a hook portion removably engageable with said securing groove of said rear cover plate, a rotatable button that is disposed outside of said accommodation space, that extends into said accommodation space to connect said swing member, and that is operable to rotate said swing member, and two spaced apart insertion holes that extend through an outer surface of said case body and an inner surface of said case body in a top-bottom direction;

a shackle unit including a long shackle leg and a short shackle leg that are respectively movably inserted through said insertion holes in a top-bottom direction, each of said long and short shackle legs having a notch; and a clutch unit mounted to said outer casing unit, and including two slide blocks that are movable in a left-right direction, and a blocking member that is movable in the top-bottom direction, each of said slide blocks having an engaging portion for removably engaging a notch of one of said long and short shackle legs;

wherein said blocking member is movable in said top-bottom direction between a locked position and an unlocked position;

wherein, in the locked position, said blocking member is interposed between said two slide blocks to lock said slide blocks against movements that causes said engaging portions of said slide blocks to disengage from said notches of said long shackle leg and said short shackle leg, so that a bottom end of said long shackle leg stably presses said rotation restricting portion of said swing member, and so that said hook portion of said swing member stably engages said securing groove of said cover plate;

wherein, in the unlocked position, said blocking member is distal to said slide blocks to allow movements of said slide blocks that causes said slide blocks to disengage from said notches of said long and short shackle legs, so that said bottom end said long shackle leg unpresses said rotation restricting portion of said swing member, said rotatable button is operable to rotate and disengage said hook portion of said swing member from said securing groove of said rear cover plate;

wherein said rear base wall further has two slide slots, that both extend in the left-right direction, and that are spaced apart in the left-right direction, one of said slide slots being higher than the other one of said slide slots in the top-bottom direction;

wherein each of said slide blocks has a top surface that faces a top side of said outer casing unit, a bottom surface that faces a bottom side of said outer casing unit, and a rear surface that faces said rear base wall, and a guide post that is slidable in one of said two slide slots in the left-right direction, and that protrudes rearwardly from said rear surface and located between said top and bottom surfaces;

wherein each of said slide blocks has said engaging portion with a first surface opposite to said notch of one of said long and short shackle legs and further has an overlapping portion that protrudes from said first surface in the left-right direction, and that has a second surface distal to said first surface;

wherein said overlapping portions of said slide blocks overlaps with each other between said engaging portions of said slide blocks and is stacked one above the other, each of said guide posts protruding rearwardly from said overlapping portion of a respective one of said slide blocks, said slide slots being formed in said rear base wall at a position rearwards of said rear surface of each of said slide blocks;

wherein, when said blocking member moves to the locked position, said guide posts of said slide blocks respectively slide along said slide slots to move away from each other; and wherein, when said blocking member moves to the unlocked position, said guide posts of said slide blocks respectively slide in said slide slots to move toward each other.

2. The electronic padlock as claimed in claim 1, further comprising a control unit disposed in said accommodation space of said outer casing unit, and including a motor, and a plunger that is connected to said motor to drive movement of said blocking member in the top-bottom direction.

3. The electronic padlock as claimed in claim 2, wherein said control unit further includes a control module signally connected to said motor, and a power supply module that is electrically connected to said control module for supplying electrical power to said control module.

4. The electronic padlock as claimed in claim 3, wherein:

said control unit further includes a finger print sensor module that is signally connected to said control module, and that has a touch panel exposed on an exterior of said outer casing unit, and adapted for detecting fingerprint input from a user; and said finger print sensor module is able to generate an unlock signal according to a fingerprint input of the user, said control module being able to receive said unlock signal and control said plunger to drive said blocking member to move from the locked position to the unlocked position.

5. The electronic padlock as claimed in claim 1, wherein:

said outer casing unit further includes a front case cover that interlocks with said case body and that cooperatively define said accommodation space with said case body;

said case body further has a surrounding wall that extends forwardly from said rear base wall to said front case cover and loops around said accommodation space; and said insertion holes are formed in said surrounding wall and spatially communicated with said accommodation space.

6. The electronic padlock as claimed in claim 1, wherein said clutch unit further includes an elastic member disposed between said two slide blocks and spaced above said blocking member in a top-bottom direction, and biasing said two slide blocks to move in the left-right direction away from each other.

7. The electronic padlock as claimed in claim 6, wherein said elastic member is a compression spring.

8. The electronic padlock as claimed in claim 1, wherein:

said second surfaces of said overlapping portions of said slide blocks respectively face said first surfaces of said engaging portions of said slide blocks in a spaced apart manner to form a gap therebetween;

when said blocking member is in the locked position, the blocking member resides in said gap, and said gap has a maximum width in the left-right direction; and when said blocking member is in the unlocked position, said blocking member moves away from said gap, and said gap has a minimum width in the left-right direction.

9. The electronic padlock as claimed in claim 8, wherein said gap has a lower gap portion to receive said blocking member, and an upper gap portion above said lower gap portion, and said clutch unit further has an elastic member disposed in said upper gap portion for biasing said slide blocks.

10. The electronic padlock as claimed in claim 1, wherein:

said rear base wall further has a rear slot that is spaced apart from said rear opening;

said rear cover plate covers both of said rear slot and said rear opening, and further has an inner surface, and a securing post that protrudes from said inner surface of said rear cover plate in a front-rear direction, that passes through said rear slot to extend into said accommodation space, and that has said securing groove, said hook portion of said security module moving in a direction transverse to the front-rear direction to extend into said securing groove when said blocking member moves to the locked position.

11. The electronic padlock as claimed in claim 10, wherein:

said rotatable button is mounted to said rear base wall near said securing groove of said rear cover plate, and has a pivot pin extending into said accommodation space through said rear base wall in the front-rear direction; and said swing member further has a pivot portion journaled on said pivot pin, said rotation restricting portion and said hook portion being connected to said pivot portion, said hook portion being moved into said securing groove when said pivot portion is rotated in a first direction, and being moved out of said securing groove when said pivot portion is rotated in a second direction opposite to said first direction, said securing post being prevented from moving away from said rear slot when said hook portion extends into said securing groove, said rotation restricting portion being pressed by said long shackle leg when said pivot portion is rotated in said one direction, and unpressed by said long shackle leg when said pivot portion is rotated in said another direction.

12. An electronic padlock comprising:

an outer casing unit including a case body that includes an accommodation space, a rear base wall having a rear opening communicated with said accommodation space, and a rear cover plate removably mounted to said rear base wall to cover said rear opening, and having a securing groove;

a security module rotatably mounted to said rear base wall, and having a swing member that is disposed swingably in said accommodation space, and that has a rotation restricting portion, and a hook portion removably engageable with said securing groove of said rear cover plate, and a rotatable button that is disposed outside of said accommodation space, that extends into said accommodation space to connect said swing member, and that is operable to rotate said swing member, and a shackle unit including a long shackle leg and a short shackle leg that are respectively movably inserted into said case body in a top-bottom direction, each of said long and short shackle legs having a notch; and a clutch unit mounted to said outer casing unit, and including two slide blocks that are movable in a left-right direction, and a blocking member that is movable in the top-bottom direction, each of said slide blocks having an engaging portion for removably engaging a notch of one of said long and short shackle legs;

wherein said blocking member is movable in said top-bottom direction between a locked position and an unlocked position;

wherein, in the locked position, said blocking member is interposed between said two slide blocks to lock said slide blocks against movements that causes said engaging portions of said slide blocks to disengage from said notches of said long shackle leg and said short shackle leg, so that a bottom end of said long shackle leg stably presses said rotation restricting portion of said swing member, and so that said hook portion of said swing member stably engages said securing groove of said cover plate;

wherein, in the unlocked position, said blocking member is distal to said slide blocks to allow movements of said slide blocks that causes said slide blocks to disengage from said notches of said long and short shackle legs, so that said bottom end said long shackle leg unpresses said rotation restricting portion of said swing member, said rotatable button is operable to rotate and disengage said hook portion of said swing member from said securing groove of said rear cover plate;

wherein said rear base wall further has a rear slot that is spaced apart and spatially separated from said rear opening;

wherein said rear cover plate covers both of said rear slot and said rear opening, and further has an inner surface disposed outside of said rear slot, and a securing post formed as a thick rod that protrudes from said inner surface of said rear cover plate into said accommodation space through said rear slot in a front-rear direction, that has a cross-sectional shape corresponding to a shape of said rear slot, that has a rear end fixed to said inner surface and fully surrounded by a boundary of said rear slot, and a front end that is opposite to said rear end and that is free of bend, and that further has a left side, a right side, a top side, and a bottom side, all of which extend from said rear end to said front end; and wherein said securing groove is a groove that is grooved into one of said left side and said right side in a left-right direction so as to extend transversely to said securing post, that is opened at said one of said left side and said right side, and that is closed at the other one of said left and right sides, said front end, said top side, and said bottom side.

13. The electronic padlock as claimed in claim 12, further comprising a water resistant cover that is formed as a plate covering an inner surface of said rear cover plate, spanning said rear opening, and being fastened to said rear cover plate.

* * * * *